US005481264A

United States Patent [19]
Kim

[11] Patent Number: 5,481,264
[45] Date of Patent: Jan. 2, 1996

[54] DATA INPUTTING APPARATUS USING ROTARY DATA DRUM

[75] Inventor: Hiroki Kim, Fussa, Japan

[73] Assignee: Casio Computer Co., Ltd., Tokyo, Japan

[21] Appl. No.: 249,259

[22] Filed: May 25, 1994

[30] Foreign Application Priority Data

May 31, 1993 [JP] Japan .................................. 5-128963

[51] Int. Cl.[6] .................................................. H03M 11/00
[52] U.S. Cl. ............................... 341/20; 341/22; 341/35; 400/484
[58] Field of Search ........................ 341/20, 22, 35, 341/192, 21; 400/484; 340/825.19

[56] References Cited

U.S. PATENT DOCUMENTS

| 3,781,802 | 12/1973 | Kafafian | 340/825.19 |
|---|---|---|---|
| 4,458,238 | 7/1984 | Learn | 341/21 |

*Primary Examiner*—Brent A. Swarthout
*Assistant Examiner*—Daniel J. Wu
*Attorney, Agent, or Firm*—Frishauf, Holtz, Goodman, Langer & Chick

[57] ABSTRACT

In a data inputting apparatus, marks are represented in a matrix form on a surface of a cylindrical data drum. These marks are constructed of characters/symbols, character ornamentation symbols, and character type designation symbols. The data drum is rotated by manipulating a knob to select a mark row containing a desired mark in correspondence with a data selection window, and also the marks present in this selected mark rows are selected in unit of column by operating column selecting keys, thereby selecting a single desired mark. A selection signal of the desired data corresponding to the above-described desired mark is produced by selecting these row and column of the marks. When this selection signal corresponds to the character/symbol mark, data about this character/symbol mark is read out from a font ROM employed in the data inputting apparatus. When either the character ornamentation symbol, or the character type designation symbol is selected, either the character ornamentation symbol mode, or the character type designation symbol mode is set, so that the data are read out from the font ROM in accordance with the font setting mode of the characters/symbols which is selected thereafter. Thus, the read data are printed out on a label tape by operating a return key.

15 Claims, 9 Drawing Sheets

FIG.3

10 COLUMNS →

32 ROWS ↓

| | 1 | 2 | 3 | 4 | 5 | 6 | 7 | 8 | 9 | 10 |
|---|---|---|---|---|---|---|---|---|---|---|
| 1 | 1 | 2 | 3 | 4 | 5 | 6 | 7 | 8 | 9 | 0 |
| 2 | A | B | C | D | E | F | G | H | I | J |
| 3 | K | L | M | N | O | P | Q | R | S | T |
| 4 | U | V | W | X | Y | Z | ! | " | ? | # |
| 5 | a | b | c | d | e | f | g | h | i | j |
| 6 | k | l | m | n | o | p | q | r | s | t |
| 7 | u | v | w | x | y | z | $ | % | & | ¥ |
| 8 | ´ | " | , | . | : | ; | [ | ] | / | \ |
| 9 | → | ← | ↑ | ↓ | + | − | × | ÷ | = | ± |
| 10 | ~ | § | ∞ | ♂ | ♀ | ⓐ | α | β | γ | δ |
| 11 | ε | ζ | η | θ | ι | κ | λ | μ | ν | ξ |
| 12 | ο | π | ρ | σ | τ | υ | φ | χ | ψ | ω |
| 13 | I | II | III | IV | V | VI | VII | VIII | IX | X |
| 14 | ① | ② | ③ | ④ | ⑤ | ⑥ | ⑦ | ⑧ | ⑨ | ⑩ |
| 15 | { | } | 〈 | 〉 | 【 | 】 | 《 | 》 | ( | ) |
| ⋮ | | | | | | | | | | |
| 32 | □ | ▨ | — | = | ∼ | ≈ | 1×½ | 1×2 | 1×3 | 2×2 |

DATA INPUTTING APPARATUS USING ROTARY DATA DRUM

BACKGROUND OF THE INVENTION

(1) FIELD OF THE INVENTION

The present invention generally relates to a data inputting apparatus. More specifically, the present invention is directed to a data inputting apparatus such as a document forming apparatus for entering desired character/symbol data and for printing a desired document.

(2) DESCRIPTION OF THE PRIOR ART

In the conventional document forming apparatuses such as wordprocessors, keyboards are utilized as the data inputting apparatus, and such various command keys as the character entry keys and the symbol entry keys provided on the keyboards are selectively depressed to enter desired data of character strings.

That is, a large number of character entry keys are provided on a keyboard of a wordprocessor so as to input characters and symbols, e.g., alphabetical numerals and alphabetical symbols. In addition, a large quantity of other specifical keys are provided on this keyboard. As these special keys, there are special designation keys, cursor keys, command keys and so on. The special designation keys are to designate typing sizes of characters, for instance, 1×½ (horizontal size of character being ½ of standard horizontal size) and 1×2 (horizontal size of character being 2 times wider than standard horizontal size), and also to designate character ornamentation such as framing, meshing and underlining. The cursor keys are to positionally control cursors displayed on screens of liquid crystal display units and CRT display units while documents are edited. Then, the command keys are numeral entry keys for entering numeral data, function keys, a return key, and control keys.

As previously explained, large quantities of keys are employed on the keyboards of the conventional document forming apparatuses in order to carry out such various process operations as data entry operations, document editing operations, and printing operations. These keys are independently arranged on each keyboard in correspondence with various functions to designate sorts of characters/ symbols of input data, and furthermore typing sizes and character ornamentation.

Indeed, such a keyboard having a large number of keys is very useful as the data inputting apparatus for the document forming apparatus, e.g., the wordprocessor capable of forming the document containing a large amount of character/ symbol information, because a great amount of such information must be entered at high speeds. However, the above-described keyboard equipped with many data entry/function keys would cause the following problems in a simple document forming apparatus, for example, a label printer in which a small number of character entry keys are employed to enter a limited number of character data and print these character data on a label tape.

That is, a label printer corresponds to a simple document forming apparatus. Although the document editing/printing performances of this simple document forming apparatus are rather inferior to those of the normal document forming apparatus such as wordprocessors, the simple document forming apparatus requires the substantially same sorts and functions of character and symbol data to be entered, as compared with those of the normal document forming apparatus. Nevertheless, since the label printers are made portable and compact, the space allowed to employ the key inputting unit on the main body of the label printer should be made small, so that only limited numbers of keys are available in this key inputting unit. To the contrary, when a large number of keys would be provided on the keyboard of the label printer, the sizes of the respective keys should be made small, resulting in difficulties of key operations.

Moreover, although the label printers are generally low cost products, as compared with the wordprocessors, since these label printers must be equipped with the key inputting units having the complex structures and also a large number of keys, the manufacturing cost of such label printers would be increased.

SUMMARY OF THE INVENTION

The present invention has been made so as to solve the above-described various problems, and therefore, has an object to provide a data inputting apparatus capable of essentially employing a large number of input switches within a small space.

Another object of the present invention is to provide a data inputting apparatus capable of assuring data entries, namely capable of eliminating an observational confirmation by an operator on a display screen, which is conventionally required in the prior art data inputting apparatuses.

Another object of the present invention is to provide a data inputting apparatus capable of simply entering input data, namely capable of readily operating the inventive data inputting apparatus by not-well-experienced operators, e.g., children and aged persons.

A further object of the present invention is to provide a data inputting apparatus with a simple construction and low cost.

A still further object of the present invention is to provide a data inputting apparatus suitable to a simple document forming apparatus such as a label printer.

To achieve the above-described objects, a data inputting apparatus, according to one aspect of the present invention, is characterized by comprising:

a rotary member rotatably provided with respect to a rotation shaft thereof, on which surface, marks corresponding to input data are represented in such a matrix form that these marks are arranged in plural rows along a rotation direction of said rotary member and also in plural columns along a direction of said rotation shaft;

index means provided at a predetermined position of an outer peripheral portion of said rotary member, for positioning one row among said plural rows of marks represented on said rotary member;

row selecting means whose major unit is assembled into said rotary member, for producing a row detection signal corresponding to said one row among said plural rows of marks represented on said rotary member, which is positioned by said index means, by switch means for detecting a rotation position of said rotary member;

column selecting means for producing a column detection signal to select one column among said plural columns of marks represented on said rotary member; and control means for producing a selection signal of input data corresponding to one mark among said plural marks represented on the surface of said rotary member in response to said row detection signal obtained from said row selecting means and also said column selecting signal obtained from said column detection signal.

In the data inputting apparatus with the above-described construction, according to the present invention, since the marks corresponding to the input data are displayed on the rotary member in a matrix form and also the major portion of the switch means for selecting the row of these marks is assembled into this rotary member, a large quantity of data inputting switches can be employed within a small space at high density. As a consequence, the data inputting apparatus can be made compact. Since the construction of this data inputting apparatus can be made simple, the manufacturing cost thereof can be lowered. The data may be inputted while the rotary member is rotated to select the row and column of the marks, and a visual confirmation is made of the marks represented on the rotating rotary member in a matrix form. As a result, the correct data entry is available and furthermore such a simple data inputting operation is realized. Thus, the data inputting operation may be readily performed by such an unexperienced operator as children.

Moreover, to achieve the above-described objects, a data inputting apparatus according to another aspect of the present invention is characterized by comprising:

a rotary member in which a rotation shaft is provided at a center of said rotary member, and marks corresponding to input data are represented on a surface of said rotary member in a matrix form constructed of plural rows along a rotation direction of said rotary member and also of plural columns along a direction of said rotation shaft;

a rotary member storage unit of a main body of a document forming apparatus, to which said rotary member is rotatably mounted around said rotation shaft as a center;

index means provided at a predetermined position of an outer peripheral portion of said rotary member, for positioning one row among said plural rows of marks represented on said rotary member;

row selecting means whose major unit is assembled into said rotary member, for producing a row detection signal corresponding to said one row among said plural rows of marks represented on said rotary member, which is positioned by said index means, by switch means for detecting a rotation position of said rotary member;

column selecting means for producing a column detection signal to select one column among said plural columns of marks represented on said rotary member; and control means for producing a selection signal of input data corresponding to one mark among said plural marks represented on the surface of said rotary member in response to said row detection signal obtained from said row selecting means and also said column selecting signal obtained from said column detection signal.

In the data inputting apparatus with the above-described construction, according to the present invention, since the marks corresponding to the input data are displayed on the rotary member in a matrix form and also the major portion of the switch means for selecting the row of these marks is assembled into this rotary member, a large quantity of data inputting switches can be employed within a small space at high density. As a consequence, the data inputting apparatus can be made compact. Since the construction of this data inputting apparatus can be made simple, the manufacturing cost thereof can be lowered. The data may be inputted while the rotary member is rotated to select the row and column of the marks, and a visual confirmation is made of the marks represented on the rotating rotary member in a matrix form. As a result, the correct data entry is available and furthermore no confirmation of the input data on the display screen of the display unit is not always required. In addition, since the data input operation may be simply performed, even such an unexperienced operator as children can easily enter the desired data. As a consequence, such a compact/cheap data inputting apparatus without any display unit, operable in a simple operation, may be suitable to a data inputting apparatus for a label printer functioning as a simple document forming apparatus.

BRIEF DESCRIPTION OF THE DRAWINGS

For a better understanding of the present invention, reference is made of the detailed descriptions in conjunction with the accompanying drawings, in which:

FIG. 3 schematically represents an example of marks indicated on a surface of the rotary data drum of the label printer shown in FIG. 1;

DETAILED DESCRIPTION OF THE PREFERRED EMBODIMENT

Referring now to drawings, a data inputting apparatus according to a preferred embodiment of the present invention will be described.

CONSTRUCTION OF LABEL PRINTER

Figure 1:
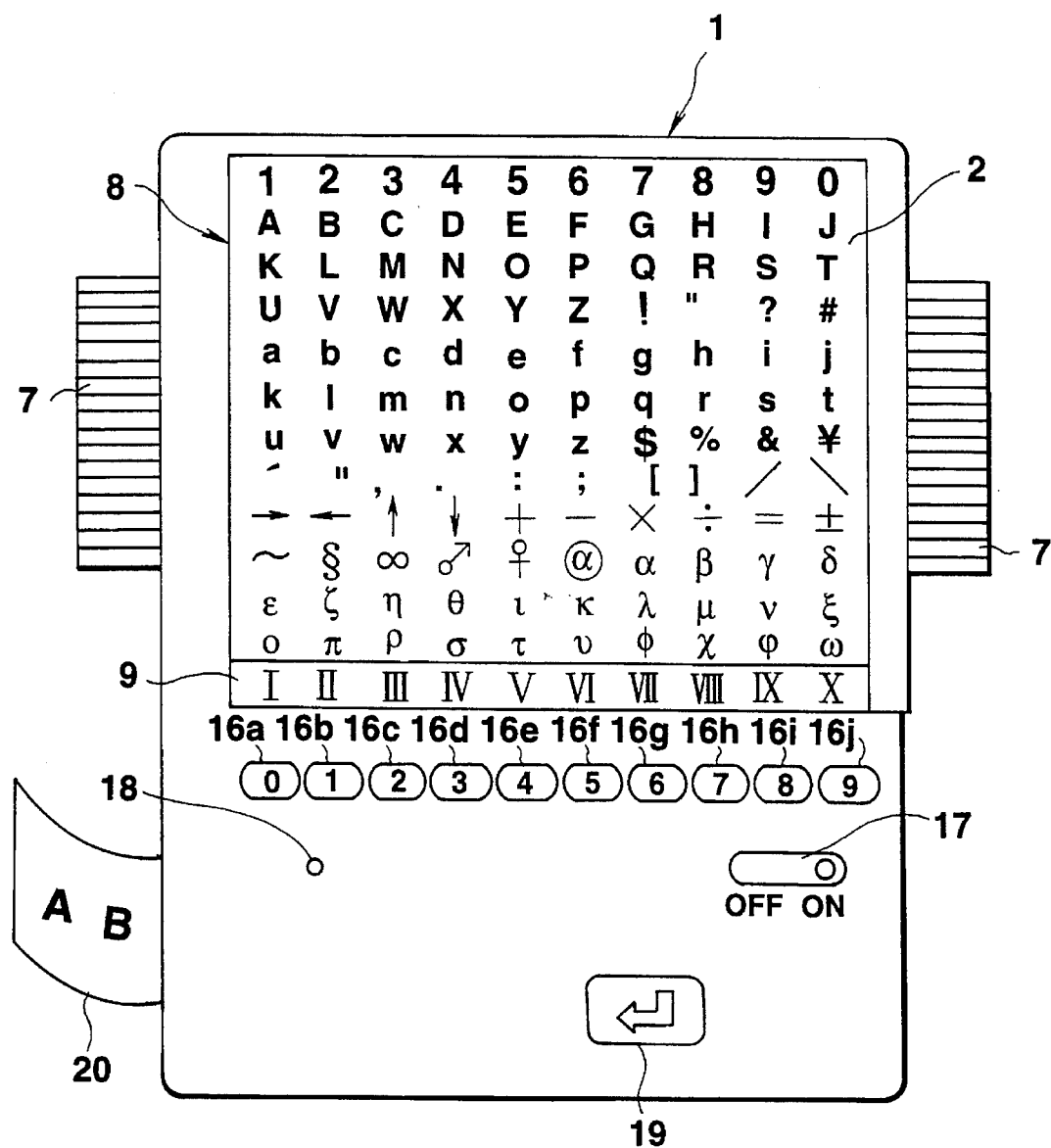
FIG. 1 is a front view of a label printer equipped with a data inputting apparatus according to a preferred embodiment of the present invention.
Figure 2:
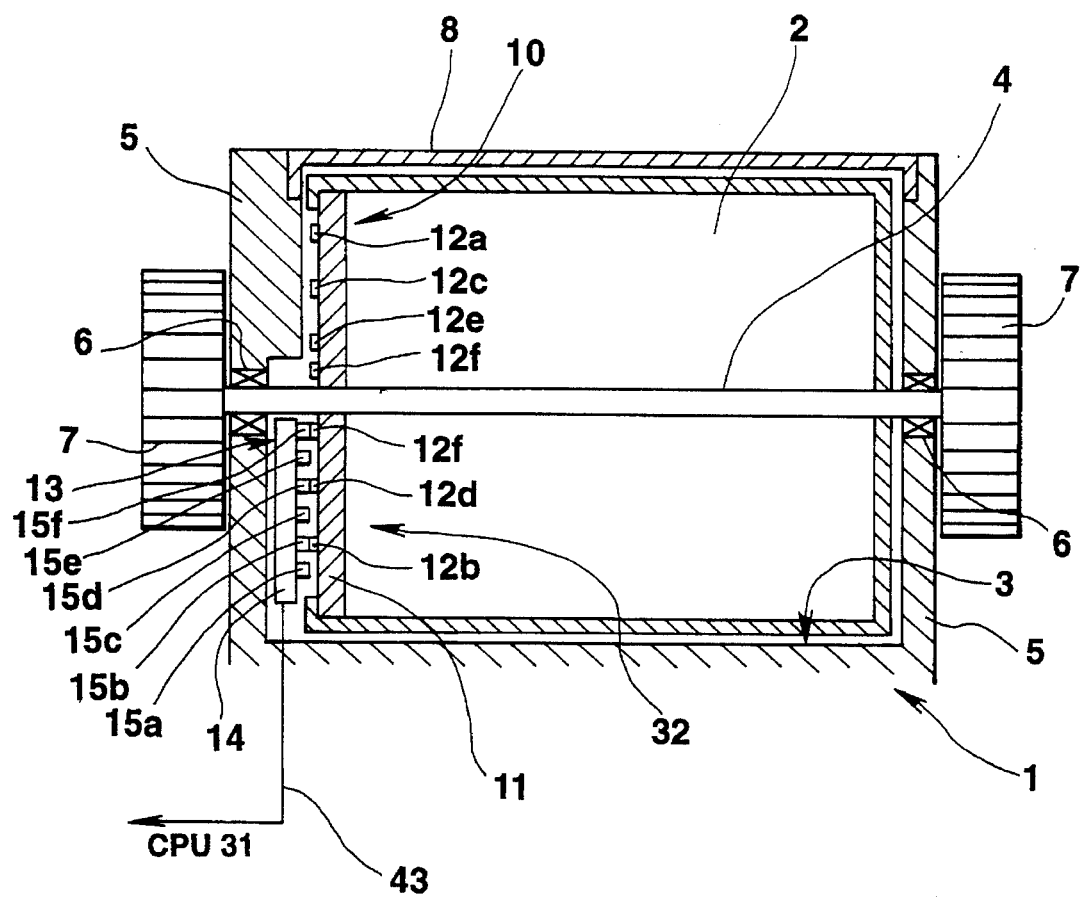
FIG. 2 is a partial sectional view of a major construction of the label printer shown in FIG. 1.

FIG. 1 is a front view of a label printer on which a data inputting apparatus according to one embodiment of the present invention has been mounted. FIG. 2 is a partial sectional view of a major portion of this label printer.

In FIG. 1 and FIG. 2, reference numeral 1 indicates a main body of the label printer, and reference numeral 2 shows a cylindrical data drum which is rotatably connected to the main body of the label printer.

The rotary data drum 2 is stored into a drum storage unit 3 (see FIG. 2) formed in a housing of the main body 1 of the label printer. A rotary shaft 4 fixed at a center of the data drum 2 is pivotally journaled by bearings 6, 6 of supporting units 5, 5 provided on both sides of the drum storage unit 3. Knobs 7, 7 are provided on both sides of the rotary shaft 4 in order to rotate the data drum 2. These knobs 7, 7 are arranged in such a manner that the knobs 7, 7 are projected from both of outer surfaces of the main body 1 of the label printer.

This data drum 2 may constitute a major portion of the data inputting apparatus according to the present invention, and corresponds to such a rotary mark representing body that marks indicative of the contents of the various keys arranged on the conventional keyboard are collectively provided on preselected positions on the cylindrical outer surface of this rotary drum 2.

Precisely speaking, 320 marks in total are represented on the cylindrical outer surface of the rotary data drum 2. The 320 marks are the characters/symbols such as alphabetical numbers and alphabetical symbols, the character ornamentation symbols constructed of framing, meshing, and underlining symbols, and the double underlines and also the waving line. Furthermore, the marks are arranged by character type designating symbols such as 1×½ (namely, a horizontal width of one character is ½ horizontal width of the standard character), 1×2 (namely, a horizontal width of one character is 2 times wider than the standard character's width), and 1×3 (namely, a horizontal width of one character is 3 times wider than the standard character's width), and also 2×2 (namely, horizontal/vertical sizes of one character are those of the standard character). These marks are regularly arranged on the drum cylindrical surface of the data drum 2 in a matrix form constructed of 32 rows and 10 columns such that the respective rows are equidistantly separated from each other along the circumferential direction of the rotary data drum 2, whereas the respective columns are equidistantly separated from each other along the cylinder axis.

Then, this data drum 2 is covered with a drum window 8 made of a transparent resin material mounted on the drum storage unit 3 of the main body 1 of the label printer. Only 13 rows of the marks among 32 rows of the overall marks represented on the cylindrical outer surface of the data drum 2 can be confirmed through this drum window 8 by a user. The reason why the 13 mark rows, namely the plural mark rows can be confirmed is that a desired 1 mark row can be easily found out.

A data selecting window 9 is provided on the edge portion of the drum window 8, and is constructed in such a manner that a red-colored frame is printed on the surface of the drum window 8 made of the transparent material. This data selecting window 9 owns the following two functions. That is, the first function of the data selecting window 9 is a positioning index for positioning a specific 1 row to which desired 1 data belongs, among the 32 mark rows represented on the cylindrical outer surface of the data drum 2 by combining this data selecting window 9 with a digital switch (will be discussed later) operable in response to the rotations of the data drum 2 when data is inputted. The second function of the data selecting window 9 is to confirm inputted data through the data selecting window 9 when the data is entered, since the label printer according to this embodiment has no display unit for the entered data.

As shown in FIG. 2, a contact board 10 on which contact patterns 12a to 12f are fabricated is provided on one side surface of the data drum 2. The contact patterns 12a to 12f are formed in such a way that a conductive metal layer having a predetermined pattern form is fabricated on a disk-shaped insulating board 11. A contact terminal plate 13 having contacts 15a to 15f fixed within the drum storage unit 3 of the main body 1 of the label printer, is located opposite to the contact board 10.

As will be described in detail, these contact board 10 and contact terminal plate 13 are combined with each other to constitute the above-explained digital switch. As previously explained, when the specific mark row represented on the data drum 2 is selected and designated by utilizing the data selecting window 9, an electric signal corresponding to the selected mark row may by produced by the switch mechanism constructed of the contact board 10 rotated and assembled into the data drum 2, and also the positionally fixed contact board 13.

Also, on the housing of the label printer's main body 1, 10 pieces of column selecting keys 16a to 16j are provided along the data selecting window 9 and in connection with the columns of the marks represented on the data drum 2. The column selecting keys 16a to 16j are combined with a column selecting means for input data, arranged by the contact board 10 and the contact terminal plate 13, thereby constituting a major portion of the data inputting apparatus according to the present invention. By depressing any one of 10 column selecting keys 16a to 16j, an electric signal corresponding to the column is generated, so that one data within one data column selectively displayed through the data selecting window 9 may be selectively designated.

On the upper surface of the label printer's main body, there are provided a power supply switch 17 for turning ON/OFF a power supply, a function selection indicator 18 which is turned ON when a designation is made of character ornamentation and/or character type, and also a return key 19 operated when a printing operation is carried out for the character/symbol data entered under such function selecting conditions as the character ornamentation designation and the character type designation.

Although not shown in the drawings, a thermal printer is built in the main body 1 of this label printer, and a label tape functioning a printed medium as well as a tape cassette for storing therein an ink ribbon are mounted in a tape cassette storage unit (not shown either). A printed label tape 20 is ejected via a tape ejection port formed in the side surface of the main body 1 of the label printer from the pate cassette outside the main body 1. That is, when the knob 7 is rotated to selectively represent, for instance, characters "A" to "J" present in the second row of the data drum 2 on the data selecting window 9, and the column selecting key 16a is manipulated to designate data "A" in the above-described label printer, a character font "A" is read out from a font ROM (read-only memory) employed in the label printer, and then this read font data is printed as printing data on the label tape 20 by utilizing the printing means of this label printer. In this case, every time any one of the above-described column selecting keys 16a to 16j is selectively operated, 1 data is designated which is displayed on the data selecting window 9 formed on the data drum 2 in correspondence with the column selecting keys 16a to 16j, and thus the designated data is o printed out on the label tape 20.

On the other hand, when either the symbol related to the character ornamentation on the data drum 2, or the symbol concerning the character type is selected by operating the knob 7 and the column selecting keys 16a to 16j, the operation mode of the label printer is set to either the character ornamentation mode, or the character type designation mode, which corresponds to the selected symbol. Thereafter, the character/symbol data entered by selectively operating the marks represented on the data drum 2, will be printed out on the label tape 20 as either the ornamental character/symbol, or the character type.

DETAILED CONSTRUCTION OF DATA INPUTTING APPARATUS

A detailed description will now be made of the data inputting apparatus mainly constructed of the data drum 2.

In FIG. 3, there is shown an example of the marks represented on the cylindrical surface of this data drum 2. As illustrated in FIG. 3, these marks are arranged in a matrix form constructed of 32 rows and 10 columns. In this mark matrix, the alphabetical numbers, alphabetical symbols and other character/symbols are represented from the first row up to the 32nd row, whereas the various symbols related to the character ornamentation (forming, meshing, underlining, and other types of lining) are represented from the first column to the sixth column in the 32nd row, and the symbols (1×½, 1×2, 1×3, 2×2 sizes) related to the character types are represented from the seventh column to the tenth column in this 32nd row. In accordance with this embodiment, a sheet on which the marks as shown in FIG. 3 have been printed is attached along the cylindrical surface of the data drum 2. These marks are arranged in such a manner that the first row to the 32nd row are positioned over its cylindrical surface of the data drum 2 along the rotation direction thereof, whereas the first column to the tenth column are positioned along the axial direction thereof.

Figure 4:
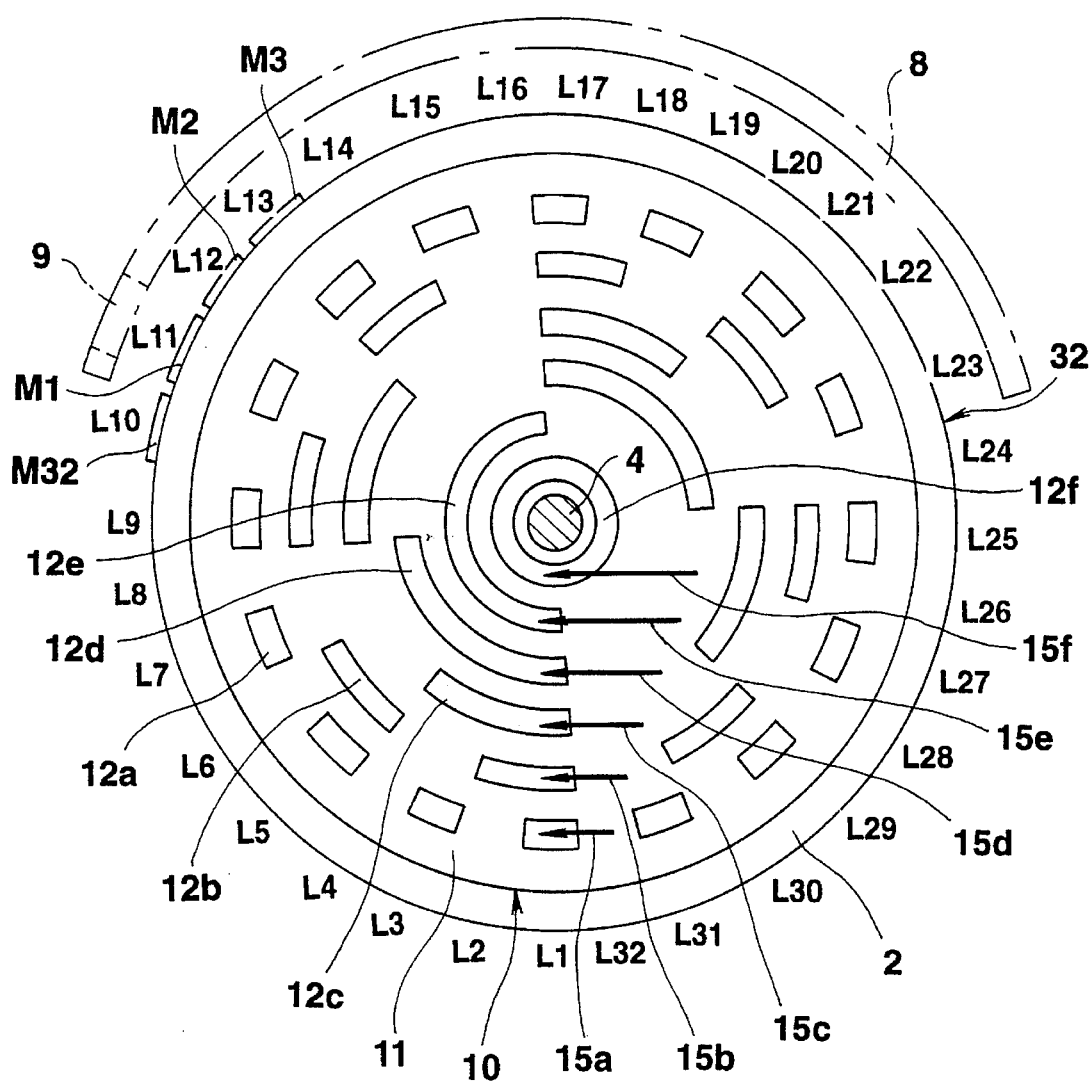
FIG. 4 schematically illustrates a relationship among the rotary data drum, contact board, and contact terminal plate of the label printer shown in FIG. 1.
Figure 5:
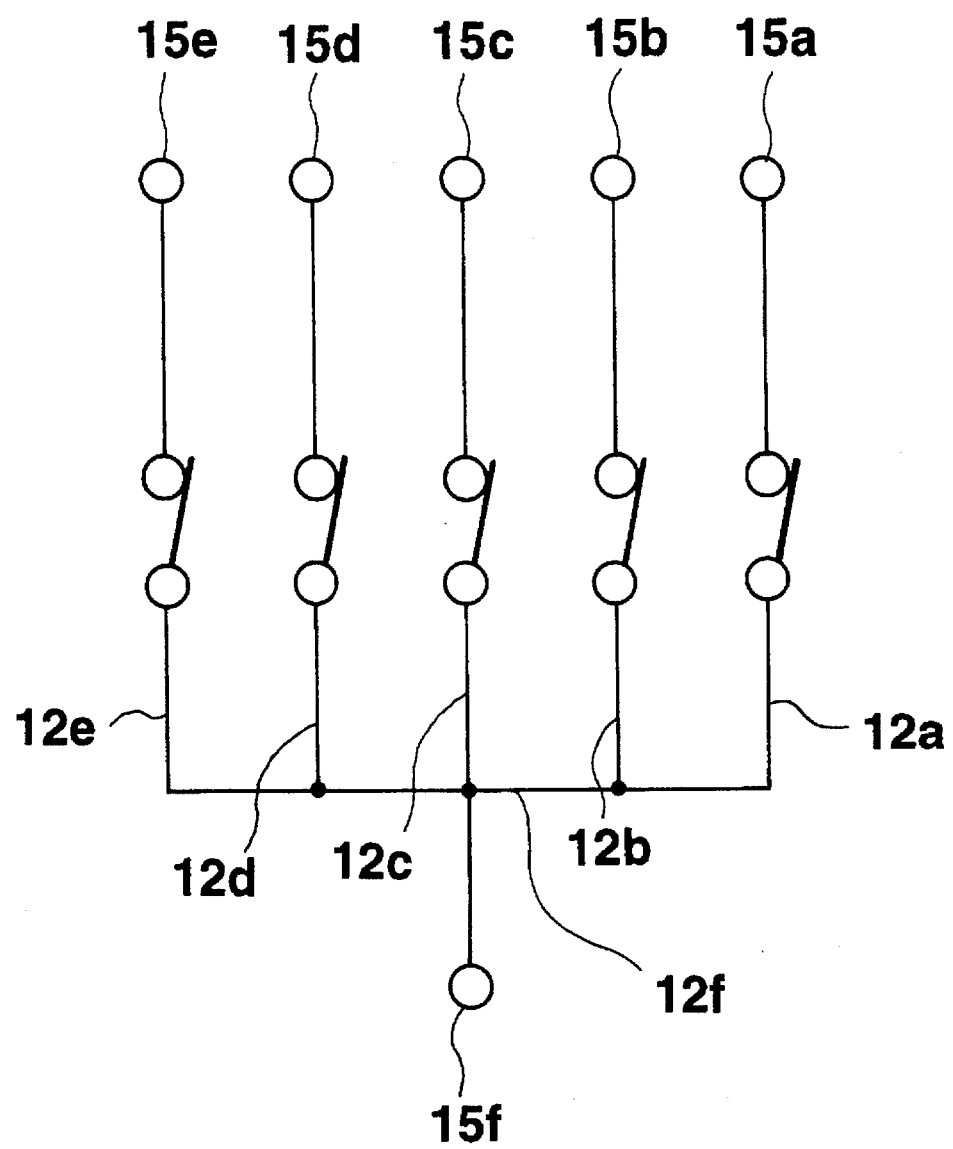
FIG. 5 is an equivalent circuit diagram of a digital switch mounted on the rotary data drum of the label printer represented in FIG. 1.

FIG. 4 indicates a relationship among the data drum 2, the contact board 10, and the contact terminal plate 13 of the label printer. FIG. 5 is an equivalent circuit diagram of a digital switch constituted of the contact board 10 and the contact terminal plate 13, which are mounted on the data drum 2 of this label printer.

As illustrated in FIG. 4, first to sixth contact patterns 12a to 12f are concentrically formed on the contact board 10 mounted on one side of the data drum 2. Although not shown in detail, the innermost contact pattern 12f among the first to sixth contact patterns 12a to 12f is connected to the first to fifth contact patterns 12a to 12e inside the data drum 2. Opposite to the above-explained contact pattern plane of the contact board 10, the contact terminal plate 13 is provided in which first to sixth contacts 15a to 15f are formed in a line form on an insulating plate 14. Each of these contact patterns 12a to 12f on the contact board 10, and each of the six contacts 15a to 15f of the contact terminal plate 13, provided in correspondence with the radial line of the contact board 10, may constitute a switch. This switch is open/closed in response to the rotation of the data drum 2. It should be noted that this switch will also be referred to a "roll switch unit" 32.

RELATIONSHIP AMONG MARKS, DATA DRUM AND OTHER COMPONENTS

Now, a description is made of a relationship among the data drum 2, the marks represented on the surface of this data drum 2, the data selecting window 9, the contact board 10, and the contact terminal plate 13.

As represented in FIG. 4, the roll switch 32 constructed of the contact board 10 and the contact terminal plate 13 may function as 32 digital switches while the data drum 2 is rotated by 1 turn. That is, in accordance with the rotary positions of the data drum 2, the first contact pattern 12a to the fifth contact pattern 12e formed on the contact board 10 are selectively connected to the first contact 15a to the fifth contact 15e formed on the contact terminal plate 13, which may constitute 32 digital switches. In this embodiment, since one rotation of the data drum 2 along the circumferential direction is subdivided into 32, the interval between the successive rows of the 32 rows for the marks correspond to a rotary angle of approximately 11.2°, so that the digital switches are present for every rotary angle of 11.2°.

In FIG. 4, symbols L1 to L32 imply the above-explained 32 pieces of digital switches corresponding to 10 marks M1 positioned in the first row up to 10 marks M32 located in the 32nd row. When these symbols L1 to L32 are rotated to be located at positions corresponding to the contacts 15a to 15f of the contact terminal plate 13 which are present at the fixed positions. Symbols M1, M2, M3, M32 (note that symbols M4 to M31 being omitted) indicate marks in the first row, the second row, the third row, and the 32nd row, respectively, represented on the surface of the data drum 2.

It should be noted that a signal "0" is produced by connecting the respective contacts 15a to 15f of the contact terminal board 13 with the corresponding contact patterns 12a to 12f of the contact board 10, whereas another signal "1" is produced by not connecting these contacts with the contact patterns.

Accordingly, in the state shown in FIG. 4, the first row M1 "123 to 0" of the mark is represented in the data selecting window 9, and therefore the pattern of the L1 portion of the contact board 10 is in contact with the contact terminal plate 13. That is, the first contact 15a to the fifth contact 15f of the contact terminal plate 13 are in contact with the first to fifth contact patterns 12a to 12e of the contact board 10, and thus these five digital switches are brought into the ON-state (note that the sixth contact 15f is continuously in contact with the sixth contact pattern 12f). FIG. 5 shows an equivalent circuit of this circuit condition. As a result, such a data row detection signal "00000" may be sent out from the first contact 15a to the fifth contact 15e in the contact terminal plate 13. When the data drum 2 is rotated along the counterclockwise direction thereby to position the second row M2 "ABC to J" of the mark within the data selecting window 9, the L2 portion of the contact board 10 is in contact with the pattern contact terminal plate 13, so that a data row detecting signal "00001" is produced from the first contact 15a to the fifth contact 15e of the contact terminal board 13. As described above, different binary code signals may be obtained while the data drum 2 is rotated. Then, when the 32nd row M32 of the mark is selected through the data selecting window 9, a data row detecting signal "11111" is generated from the contacts 15a to 15e of the contact terminal plate 13 by connecting the contact pattern of the L32 portion of the contact board 10 to the contact terminal plate 13.

ELECTRONIC CIRCUIT OF LABEL PRINTER

Figure 6:
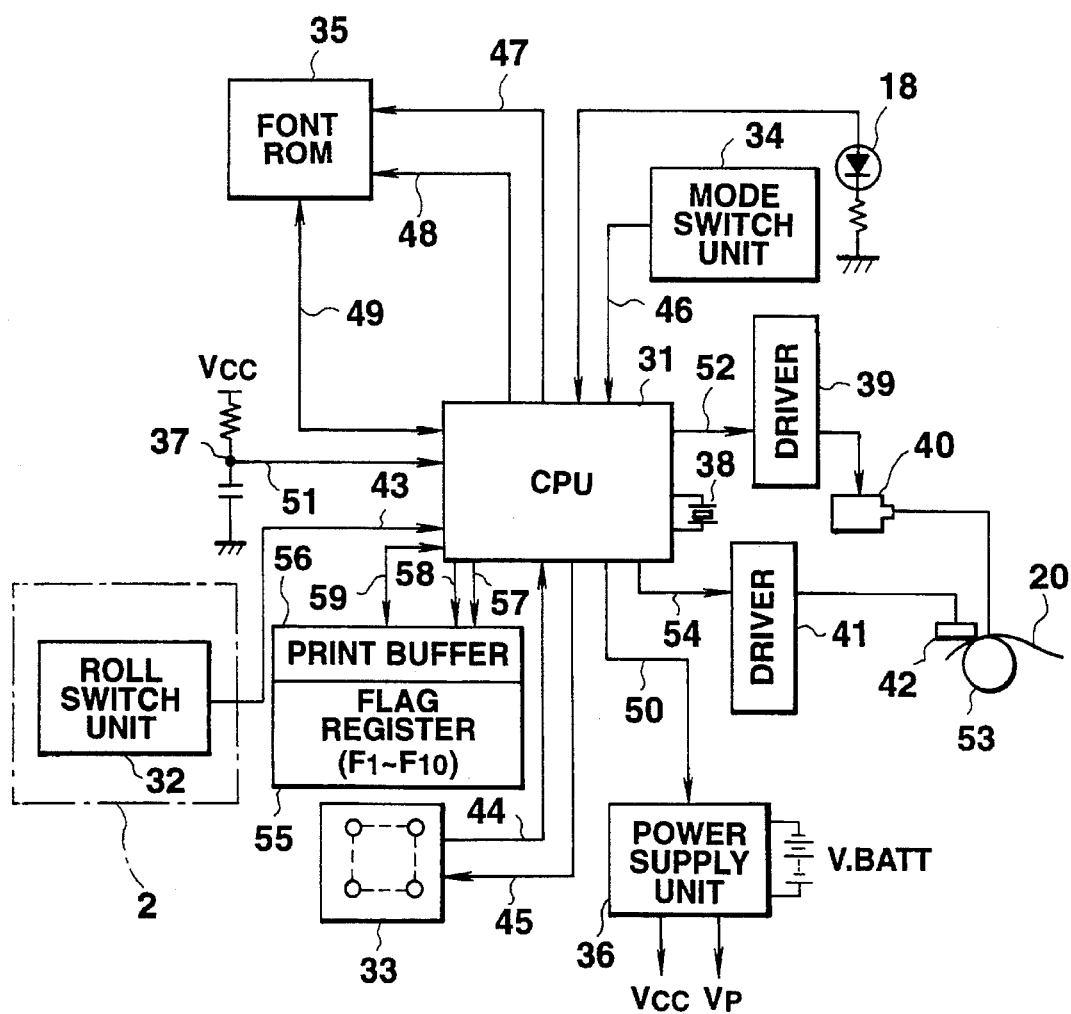
FIG. 6 schematically shows a block circuit diagram of the label printer of FIG. 1.

FIG. 6 is a schematic block diagram for showing a circuit arrangement of an electronic circuit of the above-described label printer.

In this label printer, operations of the respective circuit units are controlled by a CPU (central processing circuit) 31. To this CPU 31, the roll switch unit 32 mounted on the data drum 2 is connected. Additionally, a key input unit 33, a mode switch unit 34, a font ROM 35, a power supply unit 36, a reset signal generating circuit 37, a crystal oscillator 38, and a function selection indicator 18 are connected to this CPU 31. Furthermore, a pulse motor 40 is connected via a pulse motor driver 39 to the CPU 31, and also a thermal head 42 is connected to this CPU 31.

A roll switch signal (i.e., the above-described row detection signal) 43 produced from the roll switch unit 32 constituted by the contact board 10 and the contact terminal plate 13 is supplied to the CPU 31.

The key input unit 33 is arranged by the row selecting keys 16a to 16j and the return key 19 employed in the main body 1 of the label printer. A key out signal 44 derived from the key input unit 33 is supplied to the CPU 31, and a key in signal 45 derived from the CPU 31 is furnished to the key input unit 33.

The mode switch unit 34 is arranged by the power supply switch 17 and a font selecting switch (not shown in detail) employed in the main body 1 of the label printer. A mode signal 46 issued from this mode switch 34 is supplied to the CPU 31.

The font ROM 35 previously stores font data corresponding to the above-explained character/symbol, character ornamental symbol, and character type designation symbol represented on the data drum 2. In this embodiment, the font data about the character/symbol are stored in correspondence with the respective character types of 1×½, 1×2, 1×3, and 2×3, whereas the font data corresponding to the character ornamental symbol are stored as the bit map patterns of the framing, meshing, underlining processes, and the double underlines and also the waving line.

A read control signal 47 for this font ROM 35 is supplied from the CPU 31 to the font ROM 35, read address data is transferred via an address bus 48 thereto, and furthermore read data is transferred via another data bus 49 from the font ROM 35.

A power supply control signal 50 is supplied from the CPU 31 to the power supply unit 36, so that a predetermined power supply voltage is applied to the respective circuit units in response to ON-operation of the power supply switch 17, and a reset signal 51 used for an initialization is supplied to the CPU 31 from the reset signal generating circuit 37.

Moreover, a pulse motor control signal derived from the CPU 31 is supplied to the pulse motor driver 39, so that the pulse motor 40 is rotated to rotatably drive a platen 53.

Also, a thermal head control signal 54 issued from the CPU 31 is supplied to the thermal head driver 41, whereby the thermal head 42 is thermally driven.

On the other hand, a flag register (F1 to F10) 55 and a print buffer 56 are connected to the CPU 31.

When the six character ornamental symbols (framing, meshing, underlining processes, double underlines, waving underline, and double waving underlines) represented on the data drum 2 are selected by operating the knob 7 and also by the row/column selecting operation by the column selecting keys 16a to 16j, and of the flag F1 to the flag F6 is set into the flag register 55 in correspondence with the selected character ornamental symbol. When the four character type designation symbols (1×½, 1×2, 1×3, 2×2) are selected, any of the flags F7 to F10 is set in correspondence with the selected character type designation symbol.

Precisely speaking, when the flag F1 is set to the flag register 55, the operation mode is selected to the frame printing mode. When the flag F2 is set to the flag register 55, the operation mode is selected to the mesh printing mode. When the flag F3 is set to the flag register 55, the operation mode is selected to the underline printing mode. Also, when the flag F4 is set, the operation mode is selected to the waving-underline printing mode. If the flag F5 is set, the operation mode is selected to the double-underline printing mode. Further, when the flag F6 is set to the flag register 55, the double-waving-underline printing mode is selected. Then, when the flag F7 is set to the flag register 55, the operation mode is selected to the 1×½ printing mode. When the flag F8 is set to the flag register 55, the operation mode is selected to the 1×2 printing mode. When the flag F9 is set, then the operation mode is selected to the 1×3 printing mode. Finally, when the flag F10 is set to the flag register 55, the operation mode is selected to the 2×2 printing mode.

Under such a condition that any of these flags F1 to F10 is set to the flag register 55, the function selection indicator 18 is turned ON.

Into the print buffer 56, the font data corresponding to various setting modes read out from the font ROM 35 are stored as printing data. These setting modes data are read from the font ROM 35 in accordance with the character/symbol data displayed on the data drum 2, which are selected by operating the knob 7 and the column selecting keys 16a to 16j under such a condition that any of the flags F1 to F10 is set to the flag register 55. For example, when the character data "A" represented on the data drum 2 is selected in such a frame printing mode that the character ornamental flag F1 is set, both the frame font and the character font "A" are read out from the font ROM 35, and then are combined with each other, which will then be stored into the print buffer 56. For instance, when the character data "A" represented on the data drum 2 is selected in the 1×½ print mode under which the character type designation flag F7 is set, the character font data "A" of 1×½ is read out from the font ROM 35, and thereafter is stored into the print buffer A read/write control signal 57 for the flag register 55 and the print buffer 58 is supplied from the CPU 31.

Read/write addresses are transferred via an address bus 58, and further the read/write data are transferred via a data bus 59.

The print data stored in the print buffer 58 is read out from this print buffer and supplied to the CPU 31 in response to the key out signal 44 produced from the key input unit 33 by operating the return key Then, the print data is supplied via the thermal head driver 41 to the thermal head 42 so as to be thermally printed on the label tape 20. In conjunction therewith, the label tape 20 is transported and ejected by way of the platen 53 driven by the pulse motor 40.

OPERATION OF LABEL PRINTER

A description will now be made of operations of the label printer with the above-described construction.

Figure 7:
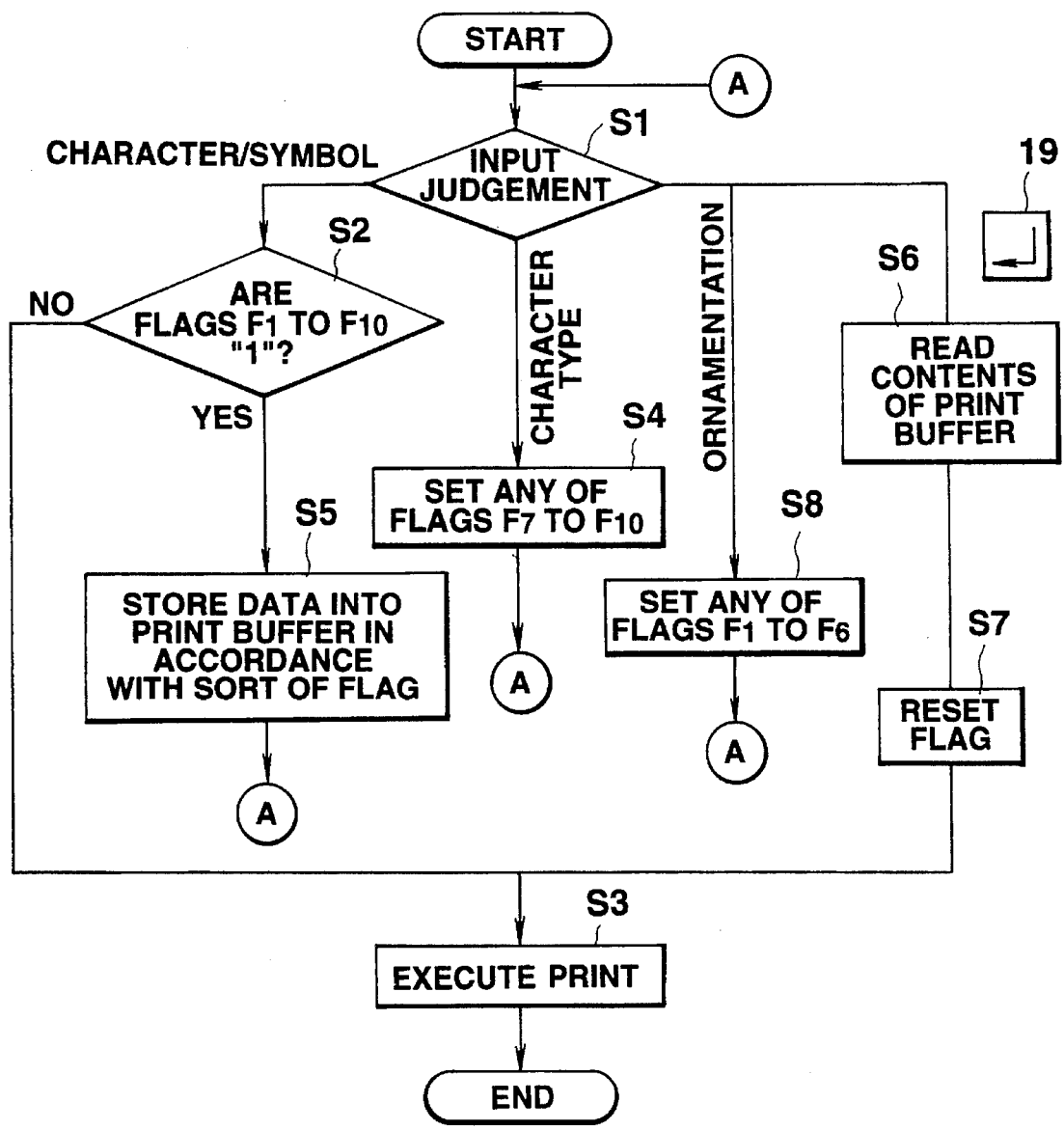
FIG. 7 is a flow chart for explaining an input printing process of the label printer shown in FIG. 1.
Figure 8:
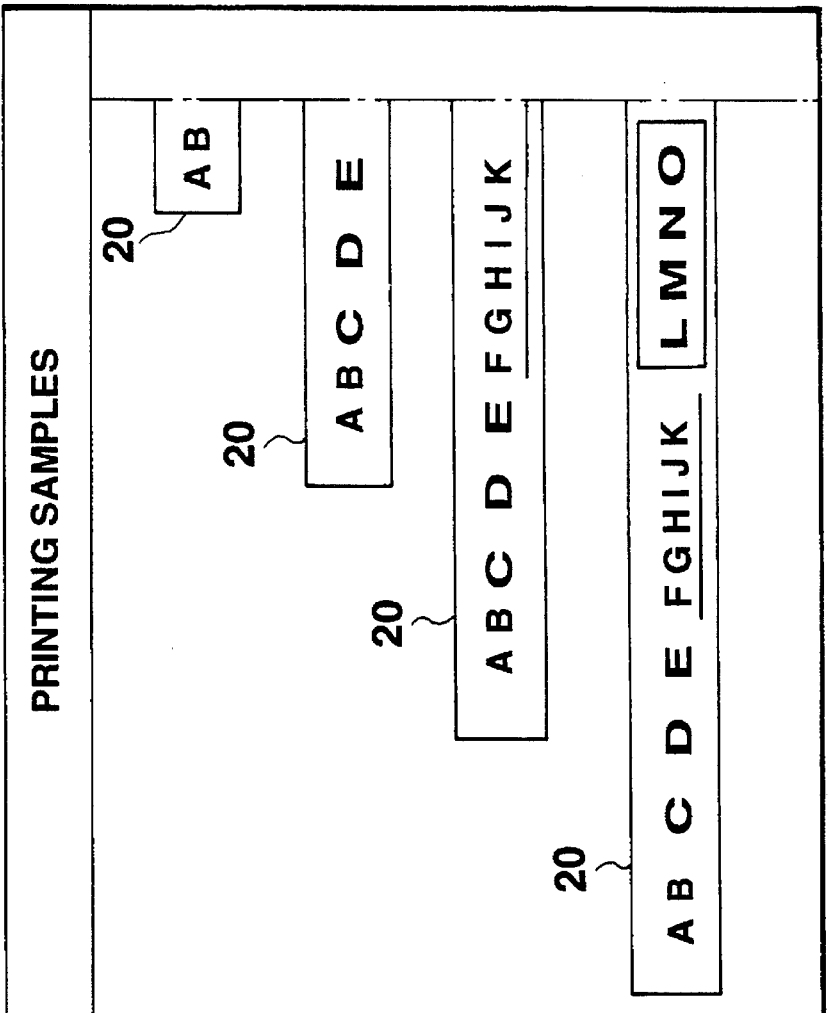
FIG. 8 represents an example of labels printed in accordance with the input printing process of the label printer of FIG. 1.

FIG. 7 is a flow chart for explaining an input printing process of the above-explained label printer. FIG. 8 illustrates a label printing sample obtained in accordance with the input printing process of the label printer.

In the flow operation of FIG. 7, when a user inputs, for example, character/symbol data of "ABCDEFGHIJKLMNO", and wants to print the first character data of "AB" by the character size of 1×1, the second character data of "CDE" by the character size of 1×2, the third character data of "FGHIJK" by the underline ornamentation, and the last character data of "LMNO" by the character size of 1×2 as well as the framing ornamentation, he firstly manipulates the knob 7 and the column selecting keys 16a to 16j, thereby sequentially selecting the character/symbol data "AB" represented on the data drum 2. Then, the set condition of the flag register 55 is judged every time the row selection is carried out (steps S1 to S2).

In this case, since no flag has been set to the flag register 55 and a judgment is made of the normal 1×1 print mode, the 1×1 font data "A", "B" are read out from the font ROM 35 in response to the matrix selecting signal produced from the roll switch unit and the key input unit 33, corresponding to the character/symbol data "A", "B" on the data drum. Thereafter, the characters "A" and "B" are printed out on the label 20 via the thermal head 42 (steps S2 to S3).

Subsequently, when the use selects the character type designating mark "1×2" on the data drum 2 by operating the knob 7 and the column selecting keys 16a to 16j in order to print the characters "CDE" by the print size of 1×2, the 1×2 flag F8 is set to the flag register 55 in response to the matrix selecting signal derived from the roll switch unit 32 and the key input unit 33, corresponding to this character type designation symbol mark "1×2", so that the CPU 31 is set to the 1×2 print mode (steps S1 to S4).

Next, when the character data "C", "D", "E" on the data drum 2 are successively selected by the matrix selecting operation effected in a similar manner to the above-mentioned manner, it is judged at the steps S1 and S2 that the 1×2 flag F8 is set to the flag register 55 every time the character data is selected.

Based upon both the 1×2 flag F8 set to the flag register 55 and the matrix selecting signal issued from the roll switch unit 32 and the key input unit 33, corresponding to the above-explained character data "C", "D", "E" on the data drum 2, the 1×2 font data "C", "D", "E" are read out from the font ROM 35, and then are stored into the print buffer 56 (steps S2 to S5).

Now, if the return key 19 is manipulated, then the 1×2 font data "C", "D", "E" stored in the print buffer 56 are read by the CPU 31, so that the 1×2 font characters of "C", "D", "E" are printed out on the label tape 20 via the thermal head 42, and furthermore the 1×2 flag F8 set to the flag register 55 is reset (steps S1 to S6, and S7, S3).

Subsequently, when the knob 7 and the column selecting keys 16a to 16j are selectively operated in order to print the underlined characters "FGHIJK", and the character ornamental underlining symbols represented on the data drum 2 are selected, the underline ornamental flag F3 is set to the flag register 55 in response to the matrix selecting signal produced from the roll switch unit 32 and the key input unit 33, corresponding to the relative character ornamental symbols "underlining". Then, the CPU 31 is set to the underline ornamental print mode (steps S1 to S8).

Thereafter, when the character data "F", "G", "H", "I", "J", "K" on the data drum 2 are sequentially selected by a matrix selecting operation similar to the above-described matrix selecting operation, a judgment is made that the underline ornamental flag F3 is set to the flag register 55 every time the matrix selection is carried out (steps S1 and S2).

As a result, both the underline font data and the 1×1 font data "F", "G", "H", "I", "J", "K" are read out from the font ROM 35 and combined with each other in response to the matrix selecting signals derived from the roll switch 32 and the key input unit 33, which correspond to the underline ornamental flag F3 set to the flag register 55 and the character data "F", "G", "H", "I", "J", "K" on the data drum 2. The combined data are stored into the print buffer 56 (steps S2 to S5).

Now, when the return key 19 is operated, the 1×1 underlined font data "F", "G", "H", "I", "J", "K" stored into the print buffer 56 are read by the CPU 31, and then are printed on the label tape 20 via the thermal head 42. In addition, the underline ornamental flag F3 set in the flag register 55 is reset (steps S1 to S6, S7 and S3).

Subsequently, when the knob 7 and the column selecting keys 16a to 16j are selectively operated so as to print out the characters "LMNO" with the character size of 1×2 and the framing ornamentation, thereby selecting the character type designation symbol 1×2 on the data drum 2, the 1×2 flag F8 is set to the flag register 55 and the CPU 31 is set to the 1×2 print mode in response to the matrix selecting signal corresponding to this character type designation symbol "1×2" and produced from the roll switch unit 32 and the key input unit 33 (steps S1 and S4).

Furthermore, when a selection is made of the symbol mark with character ornamentation frame, the framing ornamental flag F1 is set to the flag register 55 in response to the matrix selecting signal corresponding to this character ornamentation symbol mark with frame, and produced from the roll switch unit 33. Then, the CPU 31 set to the 1×2 print mode and at the same time, to the framing ornamentation print mode (steps S1 to S8).

Then, when the character data "L", "M", "N", "0" represented on the data drum 2 are successively selected by performing the matrix selecting operation, it is so judged that the framing ornamental flag F1 and the 1×2 flag F8 are set to the flag register 55 every time the matrix selecting operation is carried out (steps S1 to S2).

As a result, in response to the framing ornamental flag F1 and the 1×2 flag F8 set into the flag register 55, and also the matrix selecting signals corresponding to the character data "L", "M", "N", "0" represented on the data drum 2, produced from the roll switch unit 32 and the key input unit 33, both the framing font data and the 1×2 font data "L", "M", "N", "0" are read out from the font ROM 35 and then combined with each other, and thereafter stored into the print buffer 56 (steps S2 to S5).

Now, if the return key 19 is manipulated, then the frame-ornamental 1×2 font data "L", "M", "N", "0" stored in the print buffer 56 are read by the CPU 31. Then, these font data are printed out on the label tape 20 by thermally driving the thermal head 42, and at the same time, the frame-ornamental flag F1 and the 1×2 flag F8 set in the flag register 55 are reset (steps S1 to S6, S7, and S3).

As a consequence, the above-described label printing operation can be done by performing only the matrix selecting operations of the respective data represented on the data drum 2 with employment of the knob 7 and the column selecting keys 16a to 16j in such that, for example, the characters "AB" are printed in the character size of 1×1, the characters "CDE" are printed in the character size of 1×2, the characters "FGHIJK" are printed with the underline, and the characters "LMNO" are printed in the character size of 1×2 and with the frame ornamentation.

In accordance with the label printer of this preferred embodiment, the character/symbol, the character ornamental symbol, and the character type designation symbol, which have been represented in a matrix form on the surface of the data drum 2, are selected by operating the knob 7 in such a manner that the column of the desirable data is selected through the data selecting window 9. Single data appearing in the desirable data column selected through the data selecting window 9 is selected by operating the column selecting keys 16a to 16j. When either the character ornamental symbol, or the character type designation symbol is selected, the selected character ornamentation mode, or character type designation mode is set, and thereafter the font data of the character/symbol data selected by the matrix selecting operation are read out from the font ROM 35 by operating the return key 19 in accordance with the character ornamentation mode, or the character type designation mode, so that these character/symbol font data are thermally printed out on the label tape 20 by driving the thermal head 42.

As previously described in detail, according to the present embodiment, since the structure of the data inputting apparatus can be made simple, the manufacturing cost of this data inputting apparatus can be lowered. Moreover, since the marks are represented in a matrix form on the cylindrical data drum 2, and the digital switches corresponding to the row of these marks are assembled into the data drum 2, a large number of data inputting switches can be provided within a very small space at high density, so that the entire data inputting apparatus can be made compact. Also, since the data can be entered while the marks on the data drum 2 are visually confirmed by the user, the data may be correctly inputted by the above-explained label printer even equipped with no display unit. Furthermore, since these data may be inputted by simply depressing the column selecting keys 16a to 16j and also by rotating the data drum 2, even such an unexperienced operator as a child and an aged person can utilize this label printer with satisfaction.

MODIFICATIONS

Although the sort of data entered in the above-explained label printer according to the preferred embodiment is limited to the marks represented on the data drum 2 as illustrated in FIG. 1 and FIG. 2, the present invention is not restricted thereto. For instance, when both the above-described data drum 2 and font ROM 35 would be replaced by other data drum/font ROM (not shown in detail), the sort of input data could be increased, or decreased in order to meet user's requirements.

Figure 9:
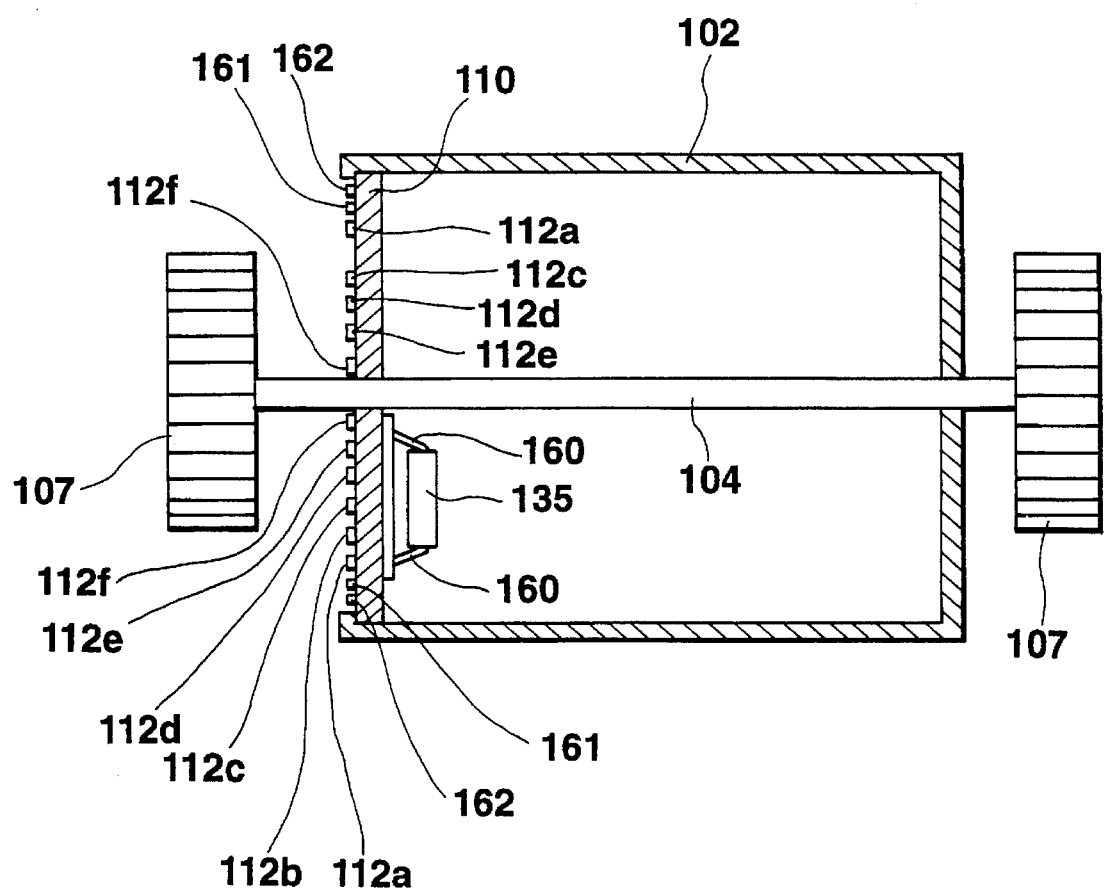
FIG. 9 is a cross sectional view for showing a construction of a cartridge type data drum detachably mounted on the label printer of FIG. 1.

Further, FIG. 9 is a cross-sectional view for showing a structure of a cartridge type data drum which is detachably mounted to the above-described label printer. In this cartridge type data drum of FIG. 9, reference numeral 102 denotes a data drum, reference numeral 104 shows a rotary shaft, reference numeral 107 shows a knob, reference numeral 110 represents a contact board, and reference numerals 112a to 112f indicate contact patterns formed on this contact board 110. It should understood that a major structure of this cartridge type data drum is similar to that of the above-explained data drum shown in FIG. 2. A different point between them is such that contents of marks represented on the cartridge type data drum 102 are different from those of the data drum 2 shown in FIG. 2, and storage contents of a font ROM 136 for previously storing font data corresponding to the marks of the data drum 102, and also the mounting position of this font ROM 135 are different from those of the above-explained font ROM 35. Furthermore, a connection structure between this font ROM 135 and the electronic circuits employed in the main body 1 of the label printer is different from the previous connection structure.

That is, the contents of these marks, which correspond to, for instance, Japanese KATAKANA characters, Arabic characters, and various sorts of pictorial marks, are represented on the data drum 102 in a matrix form, and a plurality of data drums having these different matrixed marks are prepared. These mark contacts are completely different from those of FIG. 3. Then, the font ROM 135 for previously storing the font data corresponding to the above-explained display marks is mounted inside the data drum 102. As described above, the relevant font ROM 135 may be stored within the data drum 102, so that it is very easy to replace this data drum by a desired data drum. As the font ROM 135 is built in the data drum 102, such a connection structure between the font ROM 135 and the electronic circuit employed in the label printer is equipped. Referring back to FIG. 9, reference numeral 160 indicates a terminal of this font ROM 135, reference numerals 161 and 162 show a plurality of ring-shaped connecting contacts which are coupled to this terminal 160 of the font ROM 135. A connecting contact (not shown in detail) connected to the CPU 31 employed in the main body 1 of the label printer, is provided in contact with these contact terminals 161 and 162.

What is claimed is:

1. A data inputting apparatus comprising:

a rotary member rotatably provided with respect to a rotation shaft thereof, said rotary member having a surface on which marks corresponding to input data are represented in a matrix form such that said marks are arranged in plural rows along a rotation direction of said rotary member and also in plural columns along an axial direction of said rotation shaft;

index means provided at a predetermined position of an outer peripheral portion of said rotary member, for positioning one row among said plural rows of marks represented on said rotary member;

row selecting means having a major unit which is assembled into said rotary member, said major unit including switch means for detecting a rotation position of said rotary member and for producing a row detection signal corresponding to said one row among said plural rows of marks represented on said rotary member, which is positioned by said index means;

column selecting means for producing a column detection signal to select one column among said plural columns of marks represented on said rotary member; and control means for outputting a selection signal of input data corresponding to one mark among said plural marks represented on the surface of said rotary member in response to both said row detection signal obtained from said row selecting means and said column selecting signal obtained from said column detection means, said selection signal being outputted to a document forming device.

2. A data inputting apparatus as claimed in claim 1, wherein said column selecting means comprises plural key switches corresponding respectively to said plural columns represented on said rotary member.

3. A data inputting apparatus as claimed in claim 1, wherein said row selecting means comprises a plurality of contact patterns having preselected shapes, which are provided on said rotary member in a concentric form with respect to said rotation shaft of said rotary member, and also a plurality of contacts stationarily provided at preselected positions, for making contact with said plurality of contact patterns.

4. A data inputting apparatus comprising:

a rotary member in which a rotation shaft is provided at a center of said rotary member, and marks corresponding to input data are represented on a surface of said rotary member in a matrix form wherein the marks are arranged in plural rows along a rotation direction of said rotary member and also in plural columns along an axial direction of said rotation shaft;

a rotary member storage unit of a main body of a document forming apparatus, to which said rotary member is rotatably mounted around said rotation shaft with said rotation shaft as a center;

index means provided at a predetermined position of an outer peripheral portion of said rotary member, for positioning one row among said plural rows of marks represented on said rotary member;

row selecting means having a major unit which is assembled into said rotary member, said major unit including switch means for detecting a rotation position of said rotary member and for producing a row detection signal corresponding to said one row among said plural rows of marks represented on said rotary member, which is positioned by said index means;

column selecting means for producing a column detection signal to select one column among said plural columns of marks represented on said rotary member; and control means for outputting a selection signal of input data corresponding to one mark among said plural marks represented on the surface of said rotary member in response to both said row detection signal obtained from said row selecting means and said column selecting signal obtained from said column detection means, said selection signal being outputted to a data receiving portion of said document forming apparatus.

5. A data inputting apparatus as claimed in claim 4, wherein said rotary member has a cylindrical shape.

6. A data inputting apparatus as claimed in claim 4, wherein said marks represented on said rotary member each contain one of characters, symbols character type designation symbols, and character ornamentation symbols.

7. A data inputting apparatus as claimed in claim 4, wherein said marks represented on said rotary member are arranged such that the respective rows of the matrix of marks are equidistantly separated from each other, and the respective columns of the matrix of marks are equidistantly separated from each other.

8. A data inputting apparatus as claimed in claim 4, wherein a knob is provided on said rotary member so as to rotate said rotary member.

9. A data inputting apparatus as claimed in claim 4, wherein said,document forming apparatus is a label printer.

10. A data inputting apparatus as claimed in claim 4, wherein said rotary member storage unit of the document forming apparatus comprises a window made of a transparent material formed in said storage unit, said window covering said rotary member and through which a portion of said marks arranged along the plural rows and represented on said rotary member can be observed.

11. A data inputting apparatus as claimed in claim 4, wherein said index means is provided on a window which covers said rotary member mounted in said rotary member storage unit of the document forming apparatus, and through which a portion of said marks arranged along the plural rows and represented on said rotary member can be observed.

12. A data inputting apparatus as claimed in claim 11, wherein said index means comprises a frame representation for surrounding one row of marks among said plurality of rows of marks represented on said rotary member.

13. A data inputting apparatus as claimed in claim 4, wherein said column selecting means comprises plural key switches corresponding respectively to said plural columns represented on said rotary member.

14. A data inputting apparatus as claimed in claim 13, wherein said plural key switches are provided respectively at positions corresponding respectively to the columns of the marks represented on said rotary member.

15. A data inputting apparatus as claimed in claim 4, wherein said row selecting means comprises a plurality of contact patterns having preselected shapes, which are provided on said rotary member in a concentric form with respect to said rotation shaft of said rotary member, and also a plurality of contacts stationarily provided at preselected positions, for making contact with said plurality of contact patterns.

* * * * *